United States Patent [19]

Austin, Jr. et al.

[11] Patent Number: 5,150,880
[45] Date of Patent: Sep. 29, 1992

[54] VALVE ASSEMBLY WITH FLOW CONTROL

[76] Inventors: George K. Austin, Jr., 12755 NE. Parrett Mountain Rd., Newberg, Oreg. 97132; Sandor Johannes, 2189 Hidden Springs Ct., West Linn, Oreg. 97068

[21] Appl. No.: 656,408

[22] Filed: Feb. 14, 1991

[51] Int. Cl.⁵ .......................................... F16L 29/02
[52] U.S. Cl. ................... 251/149.3; 251/149.7; 137/614.05; 285/320
[58] Field of Search ............... 137/614.05; 251/149.7, 251/149.3; 285/320, 317

[56] References Cited

U.S. PATENT DOCUMENTS

| | | | |
|---|---|---|---|
| 589,472 | 9/1897 | Hoyt | 137/614.05 |
| 629,304 | 7/1899 | Rawlins | 137/614.05 |
| 2,144,834 | 1/1939 | Di Cesare | 285/320 |
| 2,320,719 | 6/1943 | Davies | 251/149.7 |
| 2,536,702 | 11/1951 | Scheiwer | 251/149.7 |
| 2,677,558 | 5/1954 | Cornelius | 285/320 X |
| 2,831,500 | 4/1958 | Fennema | 137/614.05 X |
| 4,458,719 | 7/1984 | Strybel | 285/320 |
| 5,036,876 | 8/1991 | Jernberg | 137/614.05 X |

FOREIGN PATENT DOCUMENTS

| | | | |
|---|---|---|---|
| 336273 | 2/1936 | Italy | 137/614 |
| 957 | 1/1916 | Netherlands | 137/614 |

Primary Examiner—Alan Cohan
Attorney, Agent, or Firm—Klarquist, Sparkman, Campbell, Leigh & Whinston

[57] ABSTRACT

A female member with an internal fluid shut-off is mounted to a panel and has a bore for receiving a male member. The male member has a nose for insertion into the female portion such that it automatically opens the shut-off. The male member includes an internal flow-rate control valve and a latch for quick-disconnect from the female member.

3 Claims, 2 Drawing Sheets

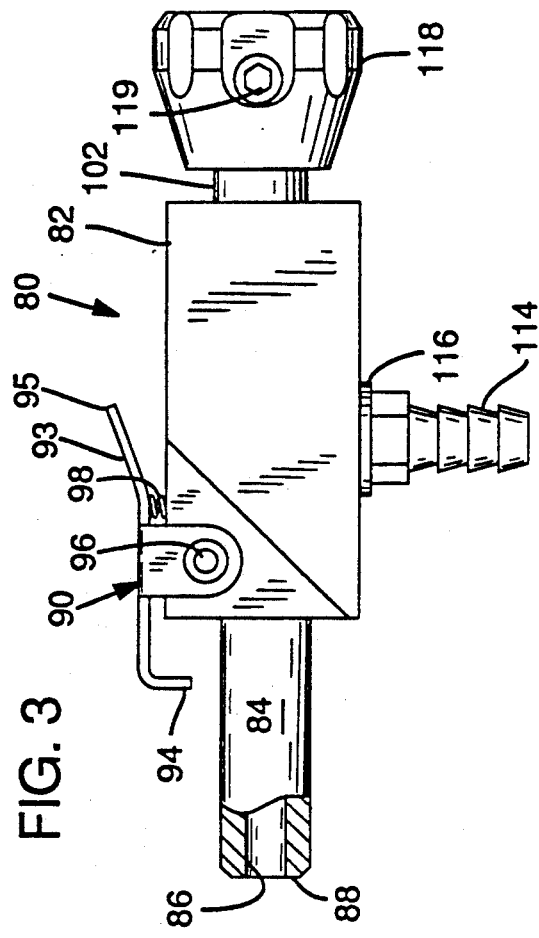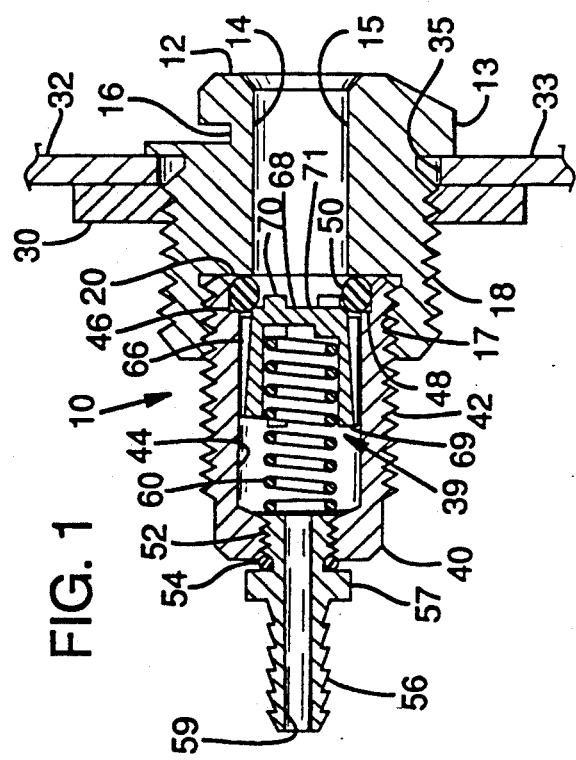

VALVE ASSEMBLY WITH FLOW CONTROL

TECHNICAL FIELD

The present invention relates to a valve assembly that is useful with a fluid delivery quick-disconnect system.

BACKGROUND INFORMATION

Fluid delivery systems may be used in dentistry for delivering liquids or gases. Valve assemblies for conventional fluid delivery systems used in dentistry include a panel-mounted female member that is in fluid communication with the fluid source. The male member of the assembly is attached to a fluid-carrying conduit that connects to the dental appliance that dispenses the fluid. A panel-mounted shut-off valve and a panel-mounted flow-rate control valve are used to control fluid flow through the conduit after the male and female members are connected.

Employing panel-mounted shut-off and flow-rate control valves takes up space on the panel surface and adds to the complexity of the plumbing for the fluid delivery system. Moreover, it is difficult to clean panel-mounted flow-rate control valves.

SUMMARY OF INVENTION

This invention is directed to a valve assembly that incorporates components that are more space-efficient and simpler to use and clean than prior such valve assemblies. The assembly is useful with a fluid delivery system and particularly comprises a female member that is mounted to the panel and is connected to a fluid source. The female member includes an internal bore for receiving fluid from the source. The valve assembly also includes a male member that has an internal orifice that is placed in fluid communication with the bore in the female member whenever the male is connected to the female member. The male member also includes an outlet through which fluid may pass into a conduit for delivery to, for example, a tray that carries impression material that is to be cooled.

The flow of the fluid through the valve assembly is controlled by a shut-off valve carried within the female member and by a flow-rate control valve carried in the male member.

The shut-off valve is retained in the female member and is normally biased into a closed position within the bore of the female member. Whenever a hollow nose portion of the male member is inserted into the female member, the shut-off valve is displaced to permit fluid flow through the female member and into the male member via the hollow nose portion of the male member. As the male member is disconnected from the female member, the shut-off valve moves back to the closed position for preventing flow through the female member.

The flow-control valve within the male member comprises a needle valve having a valve stem that is threaded into the male member. A portion of the valve stem protrudes from the male member for rotation by the user to move the valve stem tip relative to the internal orifice of the male member, thereby to regulate the flow of fluid through the outlet of the male member.

As another aspect of this invention, the male member and female member are provided with a quickdisconnect mechanism so that the male member may be readily connected and disconnected from the female member.

As another aspect of this invention, the connection of the male and female members is designed to restrict rotation of the male member relative to the female member, thereby facilitating single-handed adjustment of the protruding valve stem.

BRIEF DESCRIPTION OF THE DRAWINGS

FIG. 1 is a cross sectional view of a female member of a valve assembly of the present invention.

FIG. 2 is an exploded perspective view showing the components of the female member.

FIG. 3 is a side elevation view of the male member of the valve assembly.

DETAILED DESCRIPTION OF THE PREFERRED EMBODIMENT

Figure 4:
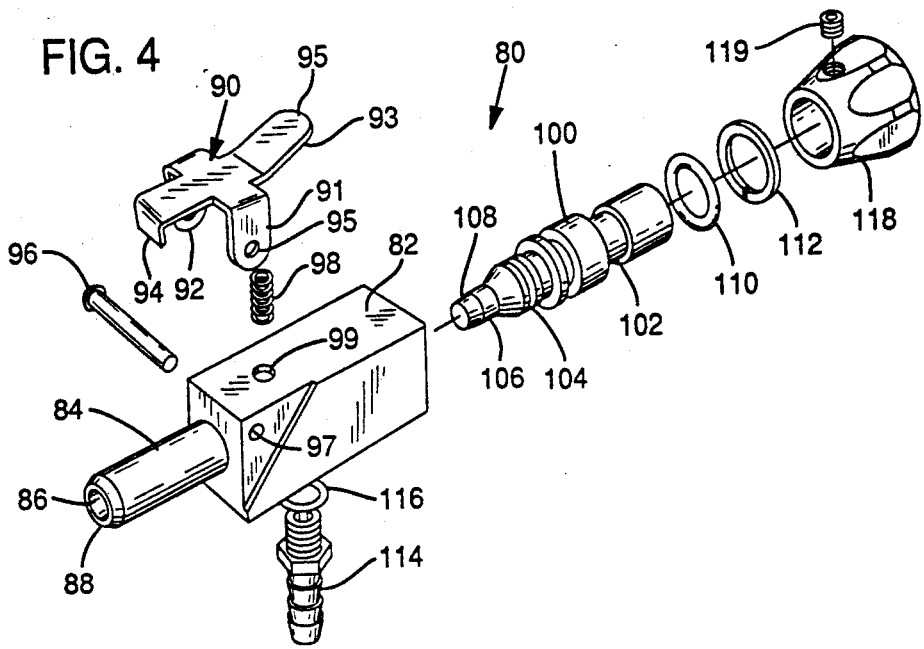
FIG. 4 is an exploded perspective view showing the components of the male member of the valve assembly.

Referring to FIGS. 1 and 2, the valve assembly of the present invention includes a female member 10 that has a body 12 that is mounted to a panel 32. The body 12 has a generally flanged outer end 13 that protrudes from the outer surface 33 of the panel 32, and an externally threaded inner end 18 that fits through an aperture 35 in the panel 32. A nut 30 threads over the inner end 18 to fasten the flanged end 13 of the body 12 against the portion of the outer surface 33 that surrounds the aperture 35.

A slot 16 is formed in the flanged end 13 of the body 12 for receiving the lip 94 of a latch 90 carried on the male member 80 (FIG. 3), as described below.

The body 12 of the female member 10 includes a stepped bore 14 extending therethrough. The outer portion 15 of the bore 14 is defined by a smooth wall. The inner portion 17 of the stepped bore 14 has a larger diameter than the inner portion 15 and is defined by threaded wall. The junction of the inner portion 15 and outer portion 17 of the bore 14 defines a shoulder 20.

The female member 10 of the valve assembly includes an internal shut-off valve 39 for preventing fluid flow through the bore 14 whenever the male member 80 is disconnected from the female member 10. The shut-off valve 39 is housed within a generally tubular retainer 40. The retainer 40 has a threaded outer surface 42 that threads into the inner bore portion 17 of the body 12. The retainer 40 also includes a central bore 44 that is adjacent to, and has a common central axis with, the bore 14 in the body 12.

The diameter of the retainer bore 44 is slightly enlarged at one end to define an annular recess 46 for receiving an O-ring 50. The O-ring 50 lodges within the recess 46 and is pressed against the shoulder 20 of the body 12 to seal the junction of the adjacent bores 14, 44.

The internal shut-off valve 39 includes a poppet 68 that is carried in the retainer bore 44 and biased by a compression spring 60 against the 0-ring 50. The poppet 68 is generally cup-shaped, having an open end 69 through which extends one end of the spring 60. The outside diameter of the open end 69 of the poppet 68 is slightly less than the diameter of the retainer bore 44 so that fluid may pass between the wall of the bore 44 and the outer surface 64 of the poppet 68, as described more fully below.

The outside diameter of the poppet 68 gradually decreases in the direction from the open end 69 to the closed end 71 of the poppet. A number of elongated, spaced apart ridges 66 protrude radially from the outer surface 64 of the poppet. The ridges 66 extend outwardly by an amount sufficient to center the poppet 68 along the central axis of the bore 44. The spaces between the ridges 66 permit fluid to pass between the ridges over the outer surface 64 of the poppet.

A number of cylindrical protrusions 70 are carried on the closed end 71 of the poppet 68. Those protrusions define a fluid path along the closed end 71 of the poppet 68 and into the male member 80 of the valve assembly as described below.

The inner end 52 of the retainer bore 44 has a reduced diameter relative to the remaining portion of the bore 44 and is threaded to receive a correspondingly threaded tubing connector 56. An O-ring 54 is located between the retainer 40 and a flange 57 on the connector 56 for sealing the connector 56 to the retainer 40.

The above-mentioned compression spring 60 continuously urges the closed end 71 of the poppet 68 against the O-ring 50 so that any fluid delivered into the retainer bore 44 via the bore 59 in the tubing connector 56 will not flow out of the retainer bore 44 until the poppet 68 is displaced from the O-ring 50 as the male member 80 is connected to the female member 10.

Figure 5:
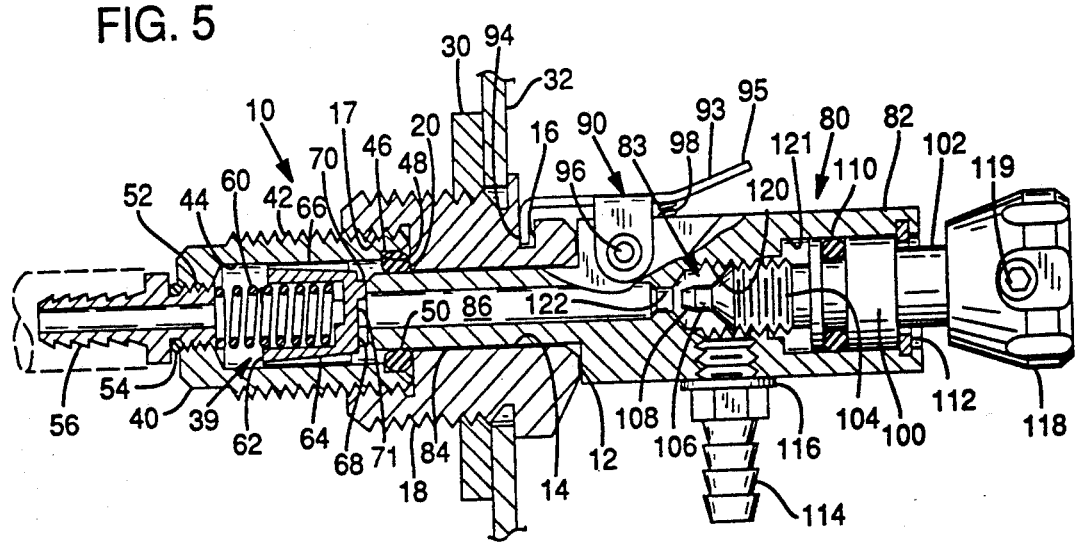
FIG. 5 is a cross sectional view of the connected female member and male member.

Referring to FIGS. 3, 4 and 5, the male member 80 includes a generally block-shaped body 82. An elongated tubular nose 84 protrudes from one end of the body 82. The outside diameter of the nose 84 is slightly less than the diameter of the bore 14 in the female member 10. A bore 86 extends through the nose and partly into the body 82. The terminus of the bore 86 within the body 82 defines a valve orifice 122 that opens into a threaded chamber 120 in the body 82.

The male member 80 of the valve assembly includes an internal flow-control valve 83. That valve includes a needle valve stem 100 that has a threaded end 104 that threads into the chamber 120. The valve stem tip 106 has a tapered portion 108 that seats within the valve orifice 122 whenever the valve stem 100 is completely threaded into the chamber 120. The threaded chamber 120 is contiguous with a smooth-walled chamber 121 through which the valve stem 100 extends. An annular recess is formed in the valve stem 100 to receive on O-ring 110 that bears against the wall of the chamber 121, thereby sealing the stem within the body 82.

Knob 118 is attached to the outermost end 102 of the valve stem 100 via a set screw 119. A snap ring 112 is fit into a groove in the body 82 and protrudes into the chamber 121 by an amount sufficient to keep the interior portion of the valve stem 100 (which portion is enlarged relative to the stem end 102) from moving completely out of the body 82.

A hollow tubing connector 114 is threaded into the bottom of the body 82. The bore (not shown) of the tubing connector 114 provides fluid outlet from the chamber 120 in the body 82. Typically, a flexible conduit is attached to the connector for delivering 114 fluid from the chamber 120 to a hand-held dental appliance. A resilient washer 116 seals the connection between the connector 114 and the male member body 82.

The above-mentioned latch 90 is pivotally mounted via pin 96 to the end of the body 82 from which the nose 84 protrudes. The latch 90 includes an elongated lever arm 93, one end of which is formed into the lip 94 mentioned earlier. L-shaped brackets 91, 92 depend downwardly from opposing sides of the mid-portion of the lever arm 93. The pivot pin 96 extends through apertures 95 in the brackets 91, 92 and through the aperture 97 that is formed through the body 82.

The end 95 of the lever arm 93 opposite the lip 94 is inclined upwardly, as best shown in FIG. 5. A compression spring 98, which has one end fixed within a recess 99 in the male member body 82 and the other end bearing against the underside of the lever arm 93, continuously urges the lip 94 of the latch downwardly for securing the lip 94 within the female valve member slot 16 whenever the male member 80 and female member 10 are connected as described next.

As shown in FIG. 5, the male member 80 of the valve assembly is connected to the female member 10 by inserting the nose 84 into the bore 14 of the female member 10. The protrusions 70 on the poppet 68 abut the advancing end 88 of the nose 84. Complete insertion of the nose 84 displaces the poppet 68 from the O-ring 50. The outside diameter of the nose 84 is slightly greater than the inside diameter of the O-ring 50. Accordingly, the nose 84 seals against the O-ring 50 as it moves through that ring to displace the poppet 68.

With the nose 84 inserted against the poppet 68, the lip 94 of the latch 90 fits into the slot 16 in the female member body 12. The spring 98 of the latch holds the lip 94 within the slot 16.

The slot 16 is substantially straight and configured to receive the latch lip 94 in a manner so that the male member body 82 is restricted from rotation about the longitudinal axis of the nose 84 whenever the male and female members are connected. One advantage of this rotation restriction is to allow single-handed rotation of the valve knob 118 relative to the body 82 to adjust coolant flow as described below.

With the male and female members connected as shown in FIG. 5, a path for coolant (or any other fluid) is defined from the interior of the retainer bore 44, along the outer surface 64 of the poppet 68 between the poppet ridges 66, along the closed end 71 of the poppet between the protrusions 70, and into the bore 86 of the nose 84. The flow rate through the valve orifice 122 (hence through the tubing connector 114) is regulated by the user by rotating the knob 118, thereby to adjust the position of the valve stem tip 106 relative to the orifice 122.

The male member 80 of the valve assembly may be quickly disconnected from the female member 10 as the user depresses the lever arm end 95 to raise the lip 94 out of the slot 16 and withdraws the nose 84 from the bore 14. As the nose 84 is withdrawn, the closed end 71 of the poppet 68 is urged by the spring 60 against the O-ring 50 to occlude flow out of the retainer bore 44.

In view of the above, it will be appreciated that the valve assembly of the present invention minimizes the number of panel-mounted components because both the shutoff valve 39 and the flow-control valve 83 are, respectively, carried by the female and male members of the valve assembly. This compact arrangement, in combination with the quick-disconnect advantage provided by the latch 90 and slot 16, provides a simple, single-handedly controllable valve assembly for a fluid delivery system. Moreover, the flow-rate control valve 83 is accessible for easy cleaning by a number of means.

Having illustrated and described the principles of the invention in a preferred embodiment, it should be apparent to those skilled in the art that the invention can be modified in arrangement and detail without departing from such principles. We claim all modifications coming within the spirit and scope of the following claims.

We claim:

1. A valve assembly comprising:
    a female member connectable to a fluid source and having an internal bore having a longitudinal axis and located for receiving fluid from the source, the female member having a straight slot formed therein to extend along an axis perpendicular to the bore axis;
    a male member including a body, an elongated nose and an internal bore for carrying fluid;
    a flow-control valve mounted to the male member and operable for regulating the flow of fluid through the internal bore, the male member being connectable to the female member so that fluid in the bore of the female member may flow through the bore of the male member;
    a latch carried on the male member and shaped to engage the straight slot on the female member when the male and female members are connected, the slot retaining the latch in a manner that prevents rotation of the connected male member relative to the female member.

2. The valve assembly of claim 1, wherein the flow-control valve includes a rotatable element protruding from inside the male member and movable about an axis of rotation parallel to the longitudinal axis of the bore for regulating fluid flow through the internal bore.

3. The valve assembly of claim 2, wherein rotation of the male member relative to the female member is prevented when the male and female members are connected and the rotatable element is rotated.

* * * * *